(12) United States Patent
Janis

(10) Patent No.: US 11,366,571 B2
(45) Date of Patent: Jun. 21, 2022

(54) VISUALIZATION COMPONENTS INCLUDING SLIDING BARS

(71) Applicant: Dentma, LLC, Farmington, UT (US)

(72) Inventor: Brandon Janis, Farmington, UT (US)

(73) Assignee: Dentma, LLC, Farmington, UT (US)

( * ) Notice: Subject to any disclaimer, the term of this patent is extended or adjusted under 35 U.S.C. 154(b) by 32 days.

(21) Appl. No.: 16/403,214

(22) Filed: May 3, 2019

(65) Prior Publication Data

US 2019/0339829 A1 Nov. 7, 2019

Related U.S. Application Data

(60) Provisional application No. 62/667,246, filed on May 4, 2018.

(51) Int. Cl.
  *G06F 3/048* (2013.01)
  *G06F 3/0483* (2013.01)
  *G06F 3/04842* (2022.01)

(52) U.S. Cl.
  CPC ........ *G06F 3/0483* (2013.01); *G06F 3/04842* (2013.01)

(58) Field of Classification Search
  CPC .............. G06F 3/04883; G06F 3/0481; G06F 3/04886; G06F 2203/04803; G06F 3/1423; G06F 1/1641; G06F 3/0483; G06F 3/04845; G06F 3/04842; G06F 3/017; G06F 3/04847; G06F 3/048; G06F 3/0484; G06F 3/0346; G06F 1/1618; G06F 3/01; G06F 9/44; G06F 2200/1614; G06F 3/04812; G06F 1/1652; G06F 9/452

See application file for complete search history.

(56) References Cited

U.S. PATENT DOCUMENTS

| | | | | |
|---|---|---|---|---|
| 5,305,435 A | * | 4/1994 | Bronson | G06F 3/0481 715/775 |
| 5,351,995 A | * | 10/1994 | Booker | G06F 3/0483 283/117 |
| 5,644,737 A | * | 7/1997 | Tuniman | G06F 3/0481 715/810 |
| 5,745,109 A | * | 4/1998 | Nakano | G06F 1/16 715/823 |
| 5,874,958 A | * | 2/1999 | Ludolph | G06F 9/451 715/781 |
| 6,175,364 B1 | * | 1/2001 | Wong | G06F 9/451 715/763 |
| 6,239,798 B1 | * | 5/2001 | Ludolph | G06F 3/0481 715/788 |

(Continued)

*Primary Examiner* — Steven B Theriault
(74) *Attorney, Agent, or Firm* — Workman Nydegger

(57) ABSTRACT

A presented user interface may include one or more sliding bars. Initially, a first user interface of an application that includes a first set of visualizations is displayed. Each of the first set of visualization corresponds to a set of functions of the application. In response to a user indication that one of the first set of visualizations is selected, a second user interface is displayed. The second user interface includes a center visualization and one or more sliding bars. In particular, the center visualization corresponds to the selected one of the first set of visualization. At least one of the one or more sliding bars is displayed at a first edge of the second user interface, and each of the at least one of the one or more sliding bars corresponds to one of the first set of visualizations.

20 Claims, 13 Drawing Sheets

(56) References Cited

U.S. PATENT DOCUMENTS

| | | | | | |
|---|---|---|---|---|---|
| 6,330,010 | B1* | 12/2001 | Nason | G09G 5/14 | 715/802 |
| 6,356,284 | B1* | 3/2002 | Manduley | G06F 3/0483 | 715/779 |
| 6,664,983 | B2* | 12/2003 | Ludolph | G06F 3/0481 | 715/775 |
| 6,825,860 | B1* | 11/2004 | Hu | G06F 9/451 | 715/801 |
| 6,850,255 | B2* | 2/2005 | Muschetto | G06F 3/0481 | 715/744 |
| 7,055,104 | B1* | 5/2006 | Billmaier | G06F 3/0481 | 715/765 |
| 7,694,233 | B1* | 4/2010 | Ording | G06F 3/0484 | 715/790 |
| 7,823,080 | B2* | 10/2010 | Miyajima | G06F 3/0481 | 715/792 |
| 8,205,169 | B1* | 6/2012 | Donohoe | G06F 3/0481 | 715/790 |
| 8,473,859 | B2* | 6/2013 | Chaudhri | G06F 3/048 | 715/782 |
| 8,473,868 | B1* | 6/2013 | Kauffman | G06F 3/0482 | 715/854 |
| 8,539,373 | B1* | 9/2013 | Jitkoff | G06F 3/0481 | 715/796 |
| 8,549,429 | B2* | 10/2013 | Tsuruta | G06F 3/0481 | 715/810 |
| 8,560,960 | B2* | 10/2013 | Goossens | G06F 3/0482 | 715/782 |
| 8,566,874 | B2* | 10/2013 | Roberts | H04N 21/4438 | 725/43 |
| 8,612,877 | B2* | 12/2013 | Chiang | H04M 1/72469 | 715/769 |
| 8,627,228 | B2* | 1/2014 | Yosef | G06F 17/00 | 715/798 |
| 8,675,024 | B2* | 3/2014 | Hwang | H04N 21/4312 | 345/661 |
| 8,762,882 | B2* | 6/2014 | Ikeda | G06F 3/04817 | 715/789 |
| 8,875,047 | B2* | 10/2014 | Beykpour | G06F 3/0481 | 715/788 |
| 8,947,385 | B2* | 2/2015 | Ma | G06F 3/04842 | 345/173 |
| 8,949,736 | B2* | 2/2015 | Balko | G06F 40/166 | 715/790 |
| 8,966,401 | B2* | 2/2015 | Kang | H04N 21/44231 | 715/848 |
| 9,037,997 | B2* | 5/2015 | Ording | G06F 3/0482 | 715/790 |
| 9,323,427 | B2* | 4/2016 | Yu | G06F 3/0482 | |
| 9,654,426 | B2* | 5/2017 | Underwood, IV | H04L 51/22 | |
| 9,753,630 | B1* | 9/2017 | Kim | G06F 3/0485 | |
| 9,996,246 | B2* | 6/2018 | Jin | G06F 3/0482 | |
| 10,042,655 | B2* | 8/2018 | Kaufthal | G06F 9/45512 | |
| 10,083,205 | B2* | 9/2018 | Shapira | G06F 16/338 | |
| 10,228,835 | B2* | 3/2019 | Yu | G09G 5/38 | |
| 10,444,974 | B2* | 10/2019 | Ha | G06F 3/0485 | |
| 10,650,052 | B2* | 5/2020 | Van Os | G06F 3/0488 | |
| 10,684,738 | B1* | 6/2020 | Sicora | G06F 16/435 | |
| 10,754,711 | B2* | 8/2020 | Hong | G06F 3/04886 | |
| 10,891,044 | B1* | 1/2021 | Corsin | G06F 3/04883 | |
| 10,969,876 | B1* | 4/2021 | Michaels | G06F 3/04842 | |
| 10,976,916 | B2* | 4/2021 | Lee | G06F 3/0482 | |
| 2001/0028365 | A1* | 10/2001 | Ludolph | G06F 3/0481 | 715/764 |
| 2002/0010718 | A1* | 1/2002 | Miller | G06F 16/904 | 715/273 |
| 2002/0135538 | A1* | 9/2002 | Rosen | G06F 16/954 | 345/1.1 |
| 2003/0063125 | A1* | 4/2003 | Miyajima | G06F 3/0481 | 715/781 |
| 2003/0160815 | A1* | 8/2003 | Muschetto | G06F 3/0481 | 715/733 |
| 2004/0141008 | A1* | 7/2004 | Jarczyk | G06F 3/0486 | 715/781 |
| 2005/0057497 | A1* | 3/2005 | Kawahara | G06F 3/04815 | 345/157 |
| 2005/0192924 | A1* | 9/2005 | Drucker | G06F 16/58 | |
| 2006/0010395 | A1* | 1/2006 | Aaltonen | H04M 1/72583 | 715/779 |
| 2006/0015804 | A1* | 1/2006 | Barton | G06F 40/18 | 715/213 |
| 2006/0156247 | A1* | 7/2006 | McCormack | G06F 3/048 | 715/767 |
| 2007/0070066 | A1* | 3/2007 | Bakhash | G06F 3/04815 | 345/419 |
| 2007/0157094 | A1* | 7/2007 | Lemay | G06F 3/0483 | 715/717 |
| 2008/0001924 | A1* | 1/2008 | de los Reyes | G06F 3/04886 | 345/173 |
| 2008/0052637 | A1* | 2/2008 | Ben-Yoseph | G06F 3/0481 | 715/800 |
| 2008/0089587 | A1* | 4/2008 | Kim | G06F 3/04815 | 382/190 |
| 2008/0155576 | A1* | 6/2008 | Horvitz | G06Q 30/0269 | 719/328 |
| 2008/0301579 | A1* | 12/2008 | Jonasson | G06F 16/44 | 715/803 |
| 2009/0002335 | A1* | 1/2009 | Chaudhri | G06F 16/904 | 345/173 |
| 2009/0013282 | A1* | 1/2009 | Mercer | G06F 3/0481 | 715/788 |
| 2009/0019031 | A1* | 1/2009 | Krovitz | G06F 16/54 | |
| 2009/0046584 | A1* | 2/2009 | Garcia | G06Q 30/02 | 370/233 |
| 2009/0049380 | A1* | 2/2009 | Rehling | G06F 16/972 | 715/700 |
| 2009/0164339 | A1* | 6/2009 | Rothman | G06Q 30/0603 | 705/26.1 |
| 2009/0172532 | A1* | 7/2009 | Chaudhri | G06F 3/0412 | 715/702 |
| 2010/0088634 | A1* | 4/2010 | Tsuruta | G09G 5/14 | 715/800 |
| 2010/0095240 | A1* | 4/2010 | Shiplacoff | G06F 3/04842 | 715/784 |
| 2010/0138767 | A1* | 6/2010 | Wang | G06F 3/0481 | 715/769 |
| 2011/0161852 | A1* | 6/2011 | Vainio | G06F 3/0488 | 715/769 |
| 2011/0193881 | A1* | 8/2011 | Rydenhag | G06F 3/04815 | 345/647 |
| 2011/0214089 | A1* | 9/2011 | Jetha | G06F 3/0482 | 715/804 |
| 2011/0296351 | A1* | 12/2011 | Ewing, Jr. | G06F 3/0483 | 715/841 |
| 2012/0084720 | A1* | 4/2012 | Sirpal | G06F 3/04847 | 715/800 |
| 2012/0084725 | A1* | 4/2012 | Sirpal | G06F 1/1616 | 715/802 |
| 2012/0159363 | A1* | 6/2012 | DeBacker | G06F 9/451 | 715/766 |
| 2012/0169609 | A1* | 7/2012 | Britton | G06F 3/0488 | 345/173 |
| 2012/0204125 | A1* | 8/2012 | Shia | G06F 3/0488 | 715/773 |
| 2012/0271545 | A1* | 10/2012 | Cheng | G06F 3/04886 | 701/431 |
| 2012/0272180 | A1* | 10/2012 | Larres | G06F 3/04817 | 715/784 |
| 2012/0278704 | A1* | 11/2012 | Ying | G06F 40/166 | 715/243 |
| 2013/0014050 | A1* | 1/2013 | Queru | G06F 3/04886 | 715/784 |
| 2013/0111395 | A1* | 5/2013 | Ying | G06F 3/0483 | 715/783 |
| 2013/0125047 | A1* | 5/2013 | Levin | G06F 3/017 | 715/790 |
| 2013/0159930 | A1* | 6/2013 | Paretti | G06F 3/0488 | 715/821 |

(56) References Cited

U.S. PATENT DOCUMENTS

| | | | | |
|---|---|---|---|---|
| 2013/0174179 A1* | 7/2013 | Park | ................ | G06F 9/4843 |
| | | | | 718/107 |
| 2013/0332826 A1* | 12/2013 | Karunamuni | ......... | G06F 16/489 |
| | | | | 715/273 |
| 2014/0137020 A1* | 5/2014 | Sharma | ................ | G06F 3/0486 |
| | | | | 715/769 |
| 2014/0143713 A1* | 5/2014 | Gudorf | ................ | G06F 3/0484 |
| | | | | 715/784 |
| 2014/0181746 A1* | 6/2014 | Lo | ................ | G06F 3/04886 |
| | | | | 715/835 |
| 2015/0019943 A1* | 1/2015 | Ying | ................ | G06F 40/186 |
| | | | | 715/204 |
| 2015/0121298 A1* | 4/2015 | Ma | ................ | G06F 3/0485 |
| | | | | 715/784 |
| 2015/0212710 A1* | 7/2015 | Gupta | ................ | G06Q 30/0641 |
| | | | | 705/27.1 |
| 2015/0286344 A1* | 10/2015 | Kaufthal | ................ | G06F 3/0484 |
| | | | | 715/768 |
| 2015/0378556 A1* | 12/2015 | Ramanathan | ....... | G06F 3/04842 |
| | | | | 715/765 |
| 2016/0086584 A1* | 3/2016 | Yokosuka | ................ | G06F 3/0481 |
| | | | | 715/766 |
| 2017/0075533 A1* | 3/2017 | Schaad | ................ | G06F 3/04883 |
| 2017/0083180 A1* | 3/2017 | Nelson | ................ | G06F 3/04845 |
| 2017/0131894 A1* | 5/2017 | de Moraes | ................ | G09G 5/14 |
| 2017/0148091 A1* | 5/2017 | Lin-Hendel | ................ | G06Q 30/08 |
| 2017/0300457 A1* | 10/2017 | Wigder | ................ | G06F 3/0483 |
| 2018/0188945 A1* | 7/2018 | Garmark | ................ | G06F 3/04883 |
| 2018/0196582 A1* | 7/2018 | Das | ................ | G06F 3/04883 |
| 2019/0121499 A1* | 4/2019 | Malkosh | ................ | G06F 3/0485 |
| 2019/0187758 A1* | 6/2019 | Lee | ................ | G06F 1/16 |

* cited by examiner

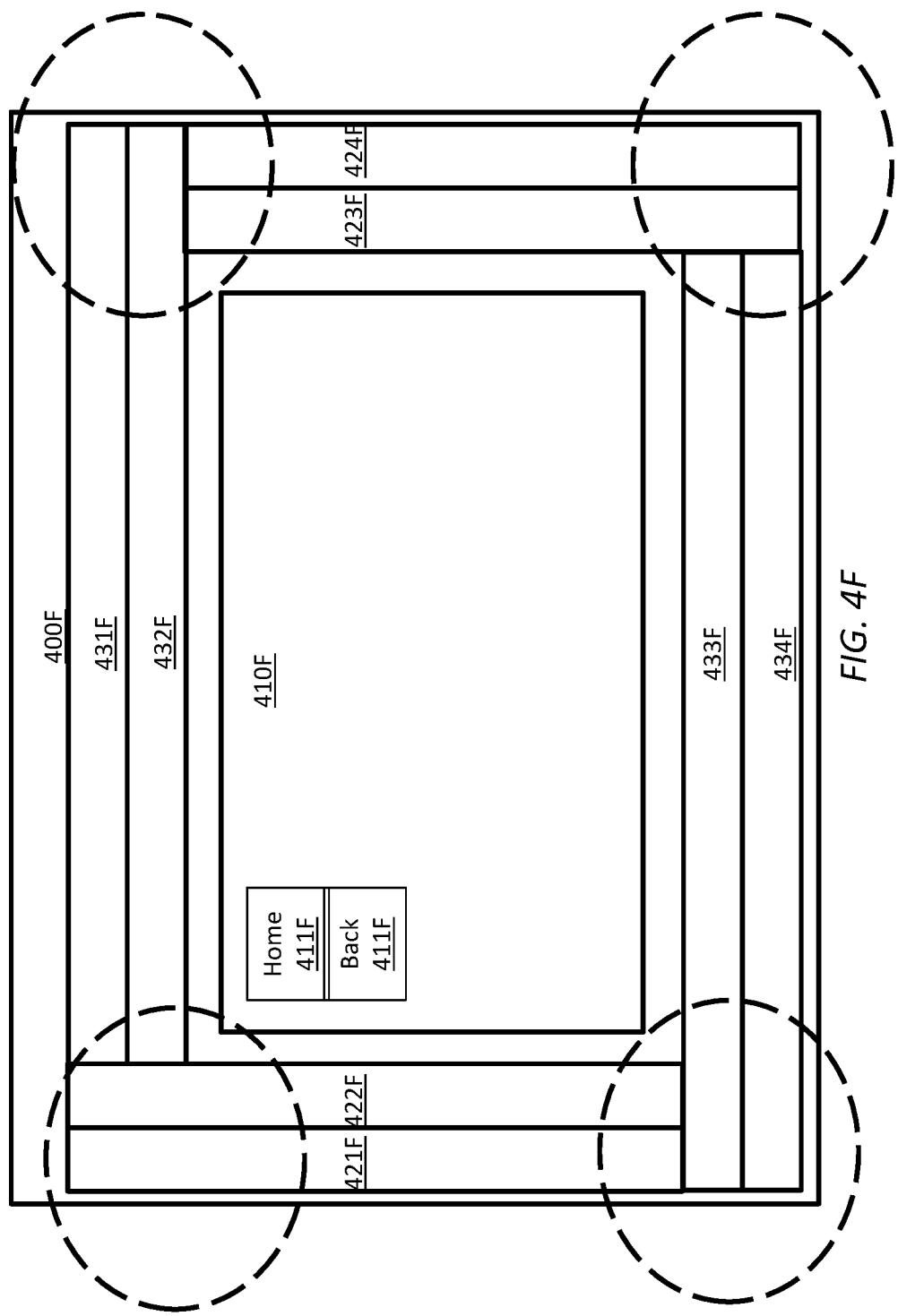

VISUALIZATION COMPONENTS INCLUDING SLIDING BARS

CROSS-REFERENCE TO RELATED APPLICATIONS

This application claims priority to and the benefit of U.S. Provisional Application No. 62/667,246, entitled "Dynamic Client Database Manger", which was filed on May 4, 2018, and which is incorporated herein by this reference in its entirety.

BACKGROUND OF THE INVENTION

Most of the modern software applications include one or more graphical user interfaces. Many such graphical user interfaces include different functions in multiple hierarchies. A home screen is often displayed first, and the user may then click a top-level link or function to see a sub-level link or function. After the sub links or subfunctions are displayed, the user can then select one of the displayed sub links or subfunctions. Thus, multiple clicks are often required to reach a sub link or subfunction. Similarly, when a user enters into a sub link or a subfunction, multiple clicks are often required to reach a different sub link or subfunction, especially when the different sub link or subfunction does not share the same parent link or function of the previously selected sub link or subfunction.

This is also often true in a web-based application environment. As an example, a web-based application often has a home page that includes multiple first-level links that a user can click. After a user clicks one of the first-level links, a list of second-level links may be displayed. The user may then select one of the second-level links. After the user selects one of the second-level links that is under a particular first-level link, it will take the user several clicks to go to a second-level link that is under a different first-level link.

Also, since modern software applications are getting more and more complex, more functions are implemented in a single application. The size of the user interface is often limited by the size of the display. Not every function can be displayed on the same page of user interface, especially when the display is a mobile device. It is often true that once a user enters into a second-level link, each of the first-level links will no longer be displayed on the user interface.

The subject matter claimed herein is not limited to embodiments that solve any disadvantages or that operate only in environments such as those described above. Rather, this background is only provided to illustrate one exemplary technology area where some embodiments describe herein may be practiced.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments disclosed herein are related to computing systems, and methods for presenting a user interface including one or more sliding bars. Initially, a first user interface of an application that includes a first set of visualizations is displayed. Each of the first set of visualization corresponds to a set of functions of the application. A user may indicate to select one of the first set of visualizations. Once the user indication is received, a second user interface is displayed. The second user interface includes a center visualization and one or more sliding bars. In particular, the center visualization is displayed at a center of the second user interface and corresponding to the selected one of the first set of visualization. At least one of the one or more sliding bars is displayed at a first edge of the second user interface, and each of the at least one of the one or more sliding bars corresponds to one of the first set of visualizations.

In some embodiments, a sliding bar that corresponds to the selected one of the first set of visualizations is selected by default. A user may then indicate to select a different sliding bar. After the user indication is received, the center visualization may be updated to display content corresponding to the selected sliding bar. Further, after the user selects a different sliding bar, the second user interface may further be updated to move at least one of the previously selected sliding bar and the currently selected sliding bar between the first edge and a second edge of the second user interface.

In some embodiments, the center visualization of the second user interface may include a second set of visualizations. Each of the second set of visualizations corresponds to a sub-function of a function that corresponds to the selected visualization of the first set of visualization. A user may indicate to select one of the second set of the visualizations. When the user indication is received, a third user interface may be displayed. The third user interface may include a new center visualization and a second set of sliding bars. The new center visualization is displayed at a center of the third user interface and corresponding to the function that corresponds to the selected visualization of the second set of visualization. Further, at least one of the second set of sliding bars is displayed at the third edge of the third user interface, and each of the at least one of the second set of sliding bars corresponds to one of the sub-functions.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and details through the use of the accompanying drawings in which:

FIGS. 4A-4F illustrate example user interfaces that include a second set of sliding bars;

DETAILED DESCRIPTION

Figure 1:
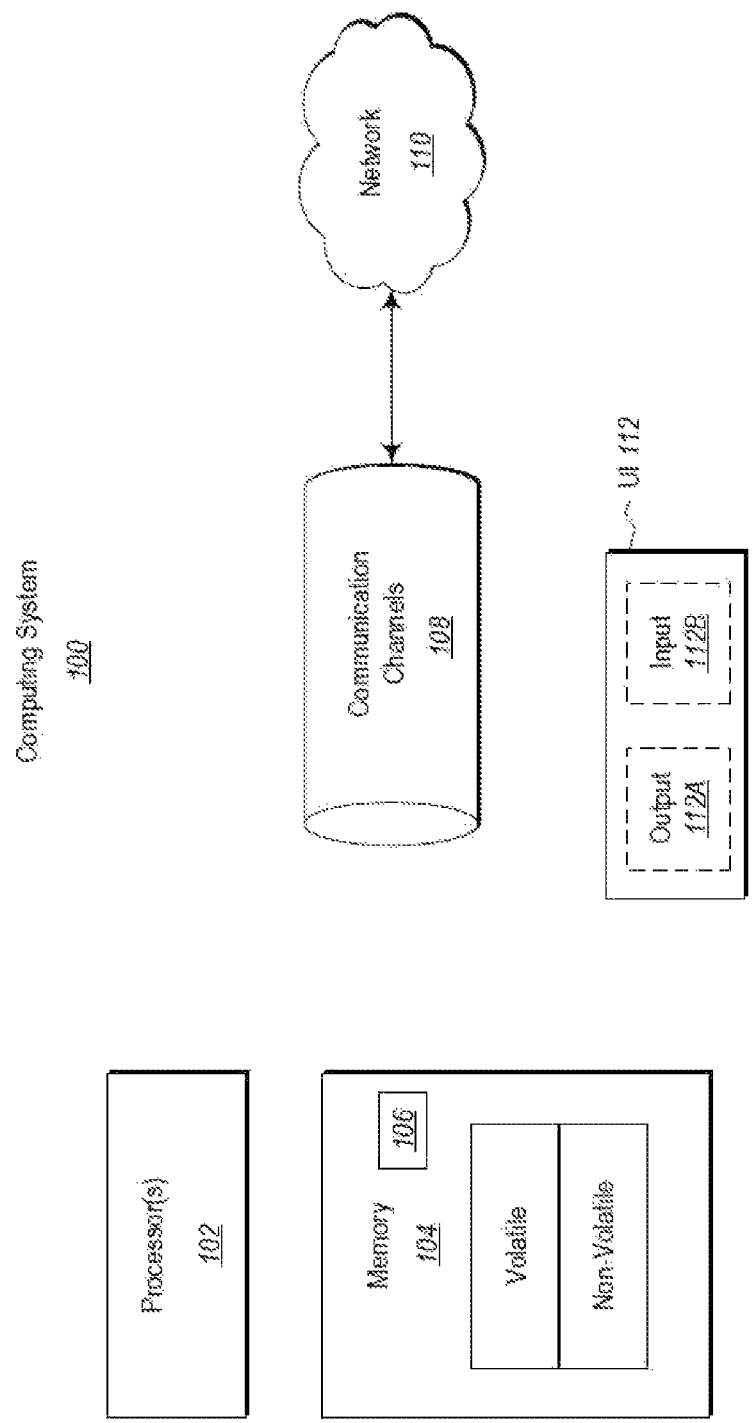
FIG. 1 illustrates an example computing system in which the principles described herein may be employed.

Embodiments disclosed herein are related to computing systems, and methods for presenting a user interface including one or more sliding bars. Initially, a first user interface of an application that includes a first set of visualizations is displayed. Each of the first set of visualization corresponds to a set of functions of the application. A user may indicate to select one of the first set of visualizations. Once the user indication is received, a second user interface is displayed. The second user interface includes a center visualization and one or more sliding bars. In particular, the center visualization is displayed at a center of the second user interface and corresponding to the selected one of the first set of visualization. At least one of the one or more sliding bars is displayed at a first edge of the second user interface, and each of the at least one of the one or more sliding bars corresponds to one of the first set of visualizations.

In some embodiments, a sliding bar that corresponds to the selected one of the first set of visualizations is selected by default. A user may then indicate to select a different sliding bar. After the user indication is received, the center visualization may be updated to display content corresponding to the selected sliding bar. Further, after the user selects a different sliding bar, the second user interface may further be updated to move at least one of the previously selected sliding bar and the currently selected sliding bar between the first edge and a second edge of the second user interface.

In some embodiments, the center visualization of the second user interface may include a second set of visualizations. Each of the second set of visualizations corresponds to a sub-function of a function that corresponds to the selected visualization of the first set of visualization. A user may indicate to select one of the second set of the visualizations. When the user indication is received, a third user interface may be displayed. The third user interface may include a new center visualization and a second set of sliding bars. The new center visualization is displayed at a center of the third user interface and corresponding to the function that corresponds to the selected visualization of the second set of visualization. Further, at least one of the second set of sliding bars is displayed at the third edge of the third user interface, and each of the at least one of the second set of sliding bars corresponds to one of the sub-functions.

The principles described herein provide a technical advance to allowing users to easily see and navigate functions of an application that are not at the same hierarchical level. Different levels of functions are displayed via sliding bars in different sides of the user interface. Further, since sliding bars are presented at the edge of the user interface, they do not take up the limited space in the center, such that the space of the user interface is used more efficiently.

Because the principles described herein may be performed in the context of a computing system, some introductory discussion of a computing system will be described with respect to FIG. 1. Then, this description will return to the principles of user interface including sliding bars with respect to the remaining figures.

Computing systems are now increasingly taking a wide variety of forms. Computing systems may, for example, be handheld devices, appliances, laptop computers, desktop computers, mainframes, distributed computing systems, data centers, or even devices that have not conventionally been considered a computing system, such as wearables (e.g., glasses). In this description and in the claims, the term "computing system" is defined broadly as including any device or system (or a combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one hardware processing unit 102 and memory 104. The processing unit 102 may include a general purpose processor and may also include a field programmable gate array (FPGA), an application specific integrated circuit (ASIC), or any other specialized circuit. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 100 also has thereon multiple structures often referred to as an "executable component". For instance, the memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods, and so forth, that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures, such as hard coded or hard wired logic gates, that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent", "manager", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data. If such acts are implemented exclusively or near-exclusively in hardware, such as within a FPGA or an ASIC, the computer-executable instructions may be hard coded or hard wired logic gates. The computer-executable instructions (and the manipulated data) may be stored in the memory 104 of the computing system 100. Computing system 100 may also contain communication channels 108 that allow the computing system 100 to communicate with other computing systems over, for example, network 110.

While not all computing systems require a user interface, in some embodiments, the computing system 100 includes a user interface system 112 for use in interfacing with a user. The user interface system 112 may include output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, tactile output, holograms and so forth. Examples of input mechanisms 112B might include, for instance, microphones, touchscreens, holograms, cameras, keyboards, mouse of other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM, or other optical disk storage, magnetic disk storage, or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. Alternatively or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing system, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

The remaining figures may discuss various computing system which may correspond to the computing system 100 previously described. The computing systems of the remaining figures include various components or functional blocks that may implement the various embodiments disclosed herein as will be explained. The various components or functional blocks may be implemented on a local computing system or may be implemented on a distributed computing system that includes elements resident in the cloud or that implement aspects of cloud computing. The various components or functional blocks may be implemented as software, hardware, or a combination of software and hardware. The computing systems of the remaining figures may include more or less than the components illustrated in the figures and some of the components may be combined as circumstances warrant. Although not necessarily illustrated, the various components of the computing systems may access and/or utilize a processor and memory, such as processor 102 and memory 104, as needed to perform their various functions.

Figure 2:
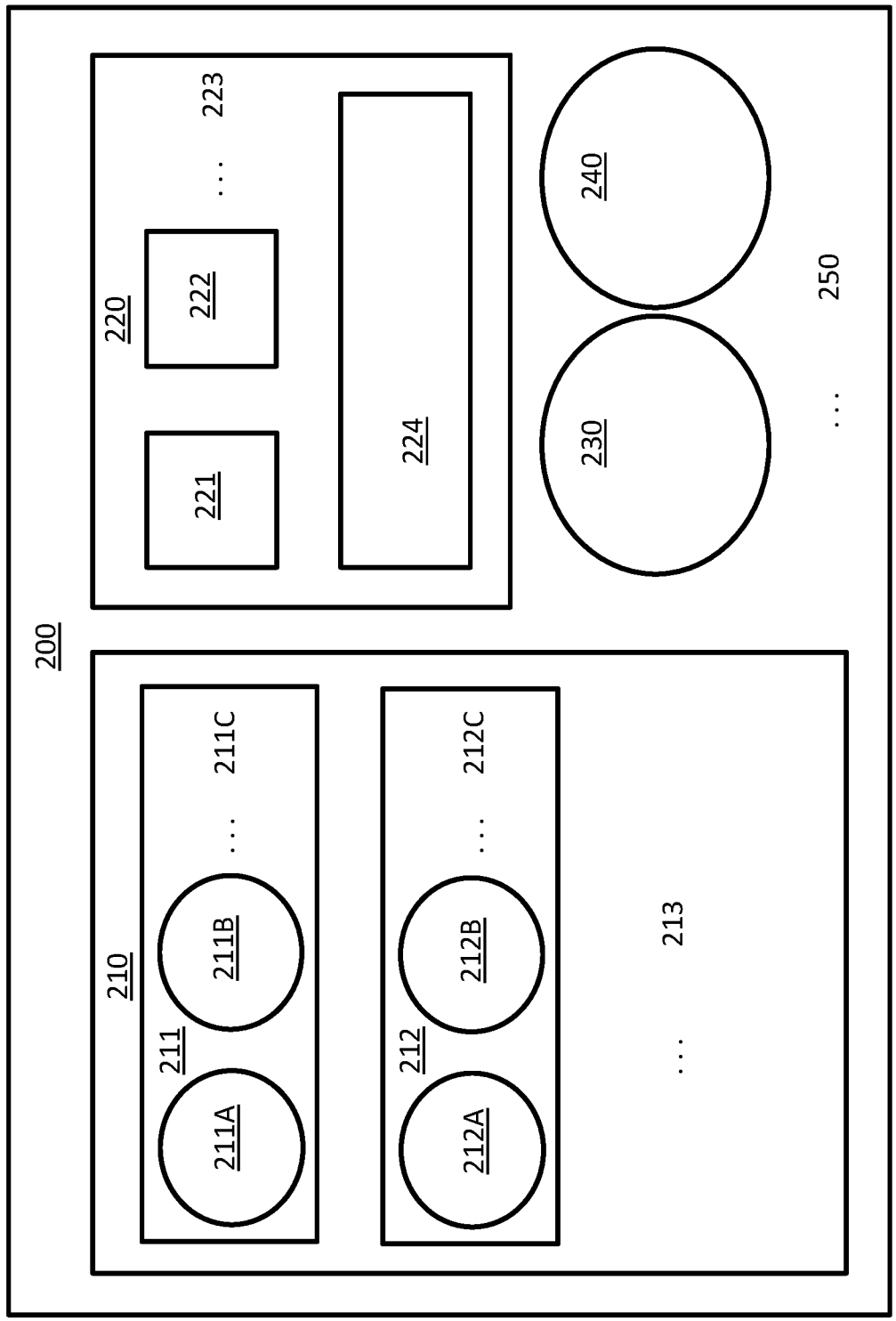
FIG. 2 illustrates an example home interface of an application.

As described above, an output 112A of a computing system may be a display that is configured to display a graphic user interface. Different graphic user interfaces may be implemented for different applications. When a user selects an application, or an application first starts, a home page or home interface is normally displayed. FIG. 2 illustrates an example home interface 200 of an application. The home interface 200 may includes different functions of the application. For example, in some embodiments, the home interface 200 may include the lowest level functions or folders a user can choose. In some embodiments, the home interface 200 may include the most frequently used functions of the application. In some embodiments, a user may customize the home interface 200 to choose the functions to be displayed, and/or layout and other appearance related options.

The home interface 200 may include multiple visualizations 210, 220, 230, 240. The ellipsis 250 represents that there may be any number of visualizations displayed on the home interface 200. Each of the visualizations 210-240 may include sub-visualizations and links that a user may select. For example, as illustrated in FIG. 2, the visualization 210 may include sub-visualizations 211, 212. The ellipsis 213 represents that there may be any number of sub-visualizations 211, 212 included in the visualization 210. Each of the sub-visualizations 211, 212 may further include multiple icons or text that a user may select or click on. For example, the sub-visualization 211 may include icons 211A, 211B. The ellipsis 211C represents that there may be any number of icons included in the sub-visualization 211. Similarly, the sub-visualization 212 may include any number of icons 212A, 212B that a user can select or click on. Each of the visualizations 210 through 240 and each of the sub-visualizations 211, 212, 221, 222, 224 may be in any shape or size depending the functions related to the visualization or sub-visualization. For example, visualizations 230 and 240 may be circle shaped, and the visualizations 210 and 220 are rectangular shaped; and the sub-visualization 221, 222 are smaller than the sub-visualization 224.

Once a user selects or clicks one of the visualizations 210-240 or one of the sub-visualizations 211, 212, 221, 222, 224, a second visualization may be presented. Often, the second visualization includes content related to the selected visualization or sub-visualization. Traditionally, the second visualization may include a link that links back to the home screen, or a menu of functions that a user can click and navigate through. Such traditional user interfaces often require multiple clicks to navigate from one function to another, especially when the two functions do not share the same parent function. Also, user often cannot easily see the hierarchical relationship among the currently selected function and other functions.

Figure 3A:
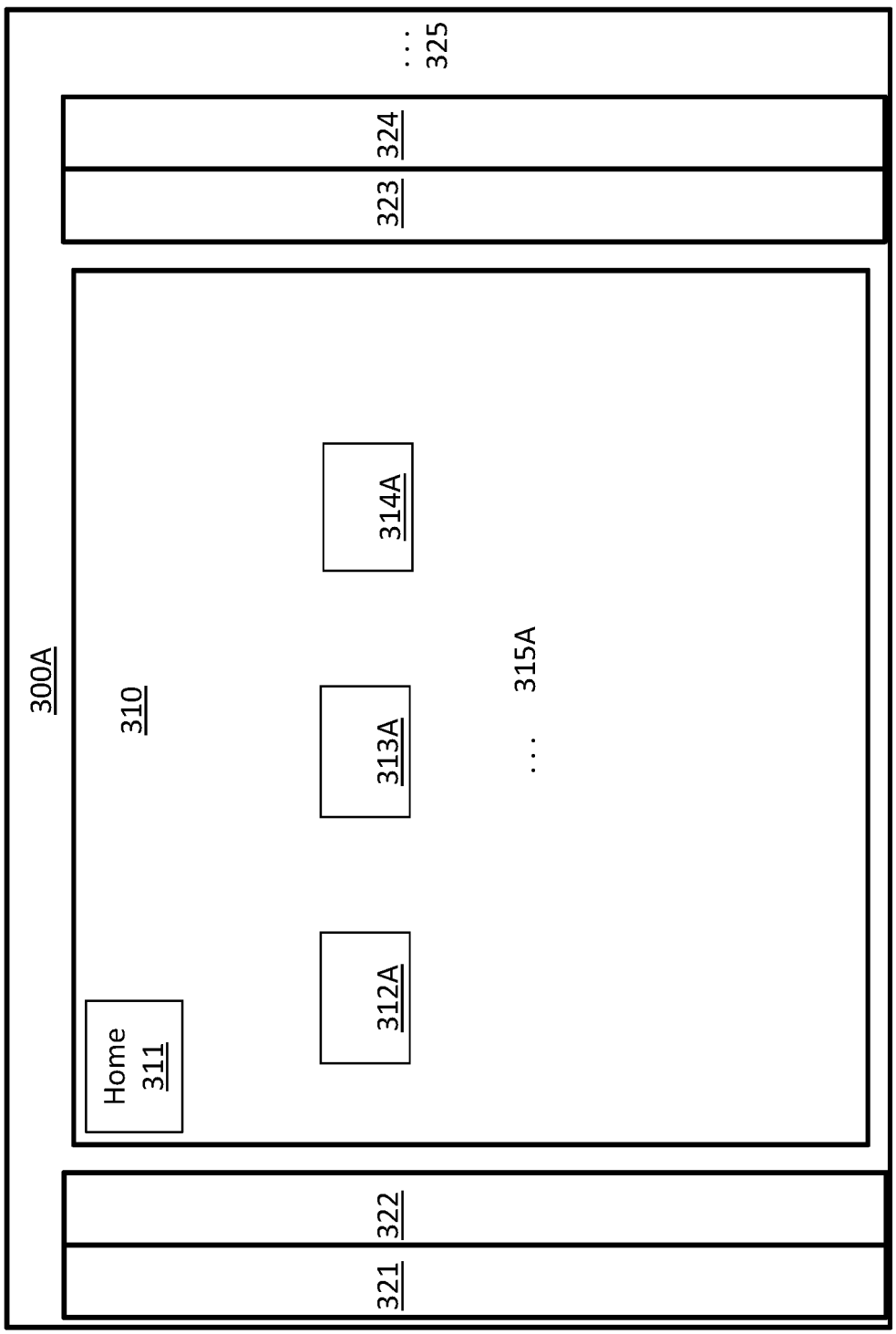
FIGS. 3A-3C illustrate example user interfaces that include a first set of sliding bars.
Figure 3B:
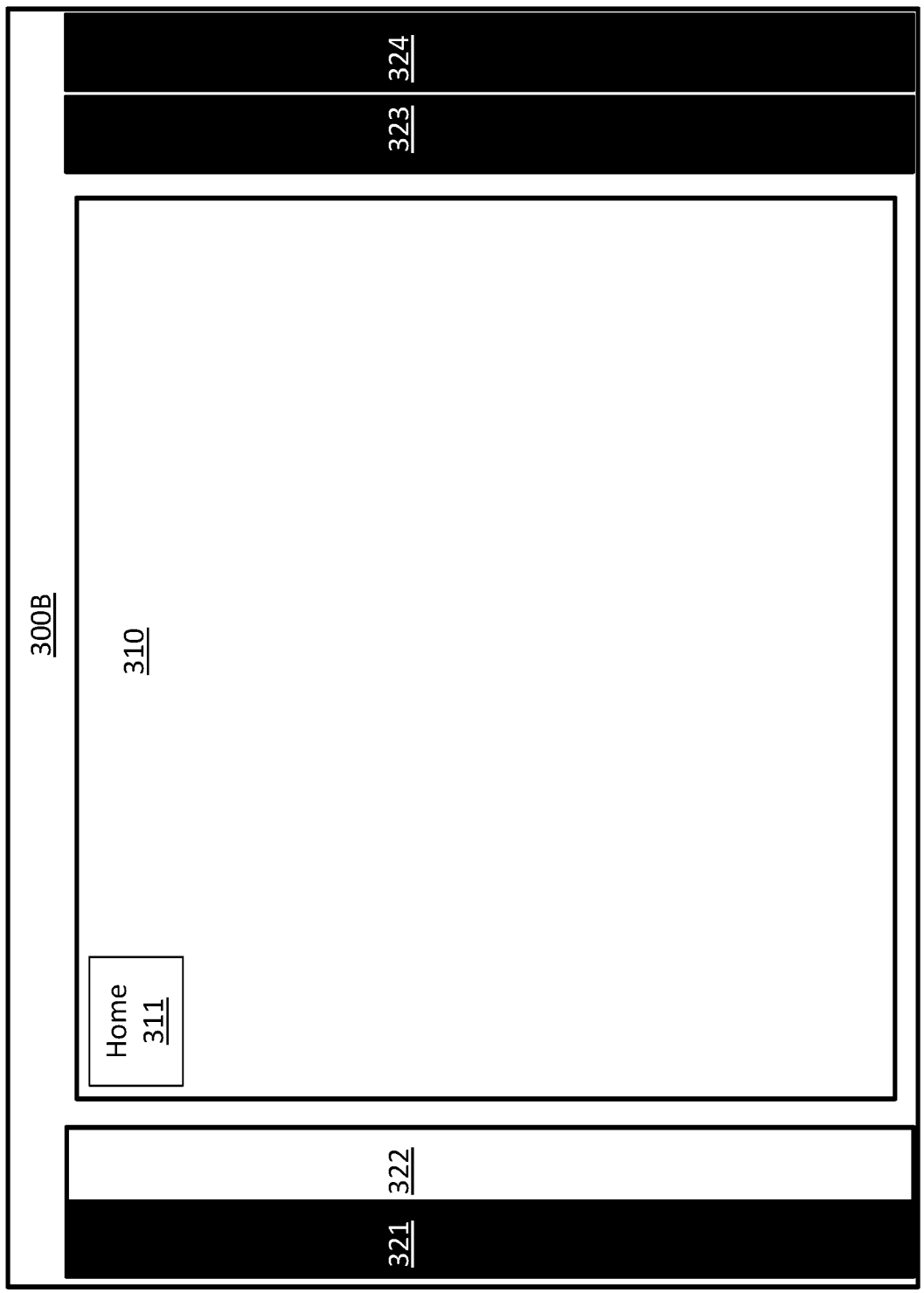
Figure 3C:
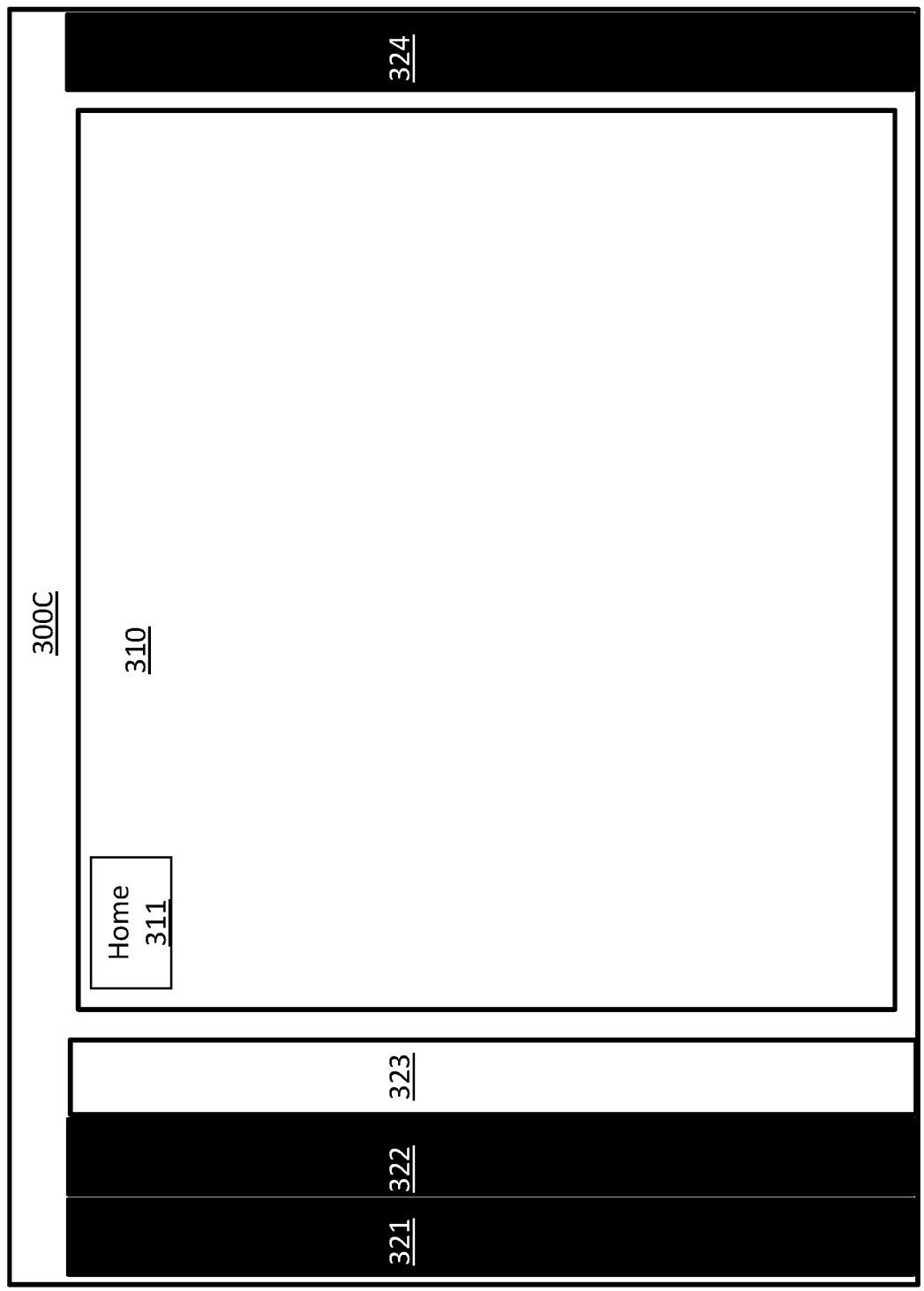

The principles described herein disclose a different approach for presenting functions of an application using one or more sliding bars. FIG. 3A-3C illustrates example user interfaces that employ the principles described herein. FIG. 3A illustrates an example user interface 300A that may be presented to a user after a user selects one of the visualizations presented in a home interface of the application, which may correspond to the visualizations 210-240 of the home interface 200 of FIG. 2. In at least one embodiment, however, the example user interface 300A may be the initial user interface that is presented to a user. As such, in at least one embodiment, it is not necessary to first view a home interface 200 depicted in FIG. 2. Further, in at least one embodiment, the example user interface 300A may comprise a first user interface of an application including a first set of visualizations, each of which corresponds to a set of functions of the application.

The user interface 300A includes a center visualization 310 and multiple sliding bars 321, 322, 323 and 324. The ellipsis 325 represents that there may be any number of sliding bars 321-324 displayed on the user interface 300. As illustrated, the sliding bars 321-324 may be displayed at the left and/or right edge of the user interface 300A. However, it is not necessary that the sliding bars 321-324 must be displayed vertically at left and/or right edge of the user interface 300A. For example, the sliding bars 321-324 may also be displayed horizontally at the top and/or bottom edge of the user interface 300A. Alternatively, the sliding bars 321-324 may also be displayed at the corner or any portion of the edge of the user interface 300A, at any angle with horizontal or vertical edge of the display.

Each of the sliding bars 321-324 may correspond to each of the visualizations displayed on the home interface 200 of FIG. 2. For example, the sliding bar 321 may correspond to the visualization 210 of FIG. 2, the sliding bar 322 may correspond to the visualization 220 of FIG. 2, the sliding bar 323 may correspond to the visualization 230 of FIG. 2, and the sliding bar 324 may correspond to the visualization 240 of FIG. 2. Each of the sliding bars 321-324 may include one or more icons or texts that indicate the function of the sliding bars.

The center visualization 310 may include content related to the selected visualization of the home interface 200. For example, when the user selects visualization 220 at the home interface, the center visualization 310A will display content related to the visualization 220. The center visualization 310 may also include a home button or any other short cut 311. If the user wants to go back to the home interface 200 or any other quick function, he/she may click the button or link 311.

Furthermore, one of the sliding bars 321-324 may correspond to the center visualization 310. The sliding bar that corresponds to the center visualization 310 may be deemed as the selected sliding bar. Different embodiments may be implemented to indicate which sliding bar has been selected.

In one embodiment, the selected sliding bar may be the left sliding bar 322 that is next to the center visualization 310. In another embodiment, the selected sliding bar may be displayed in a different color or be highlighted.

FIG. 3B further illustrates an example user interface 300B, in which the selected sliding bar 322 is displayed on the left side and next to the center visualization 310. At the same time the selected sliding bar 322 is also highlighted or presented in a different color than other not-selected sliding bars 321, 323, 324. For example, as illustrated in FIG. 3B, the selected sliding bar 322 is colored in white (or in a lighter color); and the not selected sliding bars 321, 323 and 324 are colored in black (or in a darker color).

Furthermore, a user may select a different sliding bar at any time. For example, as illustrated in FIG. 3B, the sliding bar 322 is currently selected. The user does not need to go back to the home interface 200 to choose another visualization 210-240. The user may simply select a different sliding bar to navigate to a different function corresponding to one of the visualizations 210-240. For example, if the user wants to navigate to the function corresponding to the visualization 230 of FIG. 2, he/she may simply click the sliding bar 323.

FIG. 3C illustrates an example user interface 300C, in which the user has selected the sliding bar 323. In one embodiment, when a user selects a different sliding bar, the selected sliding bar will slide to the left position that is next to the center visualization 310, and the center visualization 310 will update to content corresponding to the selected sliding bar. For example, when a user selects the sliding bar 323 of FIG. 2, the sliding bar 323 may move to the left side and become 323 of FIG. 3. At the same time, the center visualization 310 may update from the previously displayed content (related to the visualization 220 and the sliding bar 322) to the content related to visualization 230 and the sliding bar 323.

Also, the selected sliding bar may be indicated by a highlight or in a different color. As illustrated in FIG. 3C, the selected sliding bar 323 changes its color from black (or a dark color) to white (or a light color). The previously selected sliding bar 322 also changes its color from white (or a light color) to black (or a dark color).

As another example, if the user selects the sliding bar 321, the selected sliding bar 321 will not need to move from the left side to the right side completely, but only moves from the far left to a closer position to the center visualization 310, i.e., the sliding bars 321 and 322 switch their places.

Note, FIGS. 3A through 3C merely illustrate an example embodiment of how the sliding bars may be presented. It is not necessary that the selected sliding bar must be displayed at the left side of the center visualization 310. In some embodiment, to save space, the selected sliding bar may be removed completely (i.e., not displayed) from the second user interface 300C. In some embodiment, the selected sliding bar may only change its color, but not move from one place to another. In some embodiment, the selected sliding bar may only move from one place to another, but not change color.

In some embodiments, the center visualization 310 may also include sub-functions. For example, the visualization 220 of the home interface 200 includes sub-visualizations 221, 222, 224, each of which may correspond to a sub-function. When a user clicks the visualization 220 on the home interface 200, the center visualization 310 may display the list of sub-visualizations 312A through 314A, each of which corresponds to a respective sub-visualization 221, 222, 224. The ellipsis 315A represents that there may be any number of sub-visualizations 312A through 314A displayed in the center visualization 310.

The user may further be allowed to select each one of the sub-visualizations 312A through 314A displayed in the center visualization 310. After one of the sub-visualizations 312A through 314A is selected, a third user interface may be displayed. The third user interface may include a second set of sliding bars that are placed at another side of the edge of the user interface.

Figure 4A:
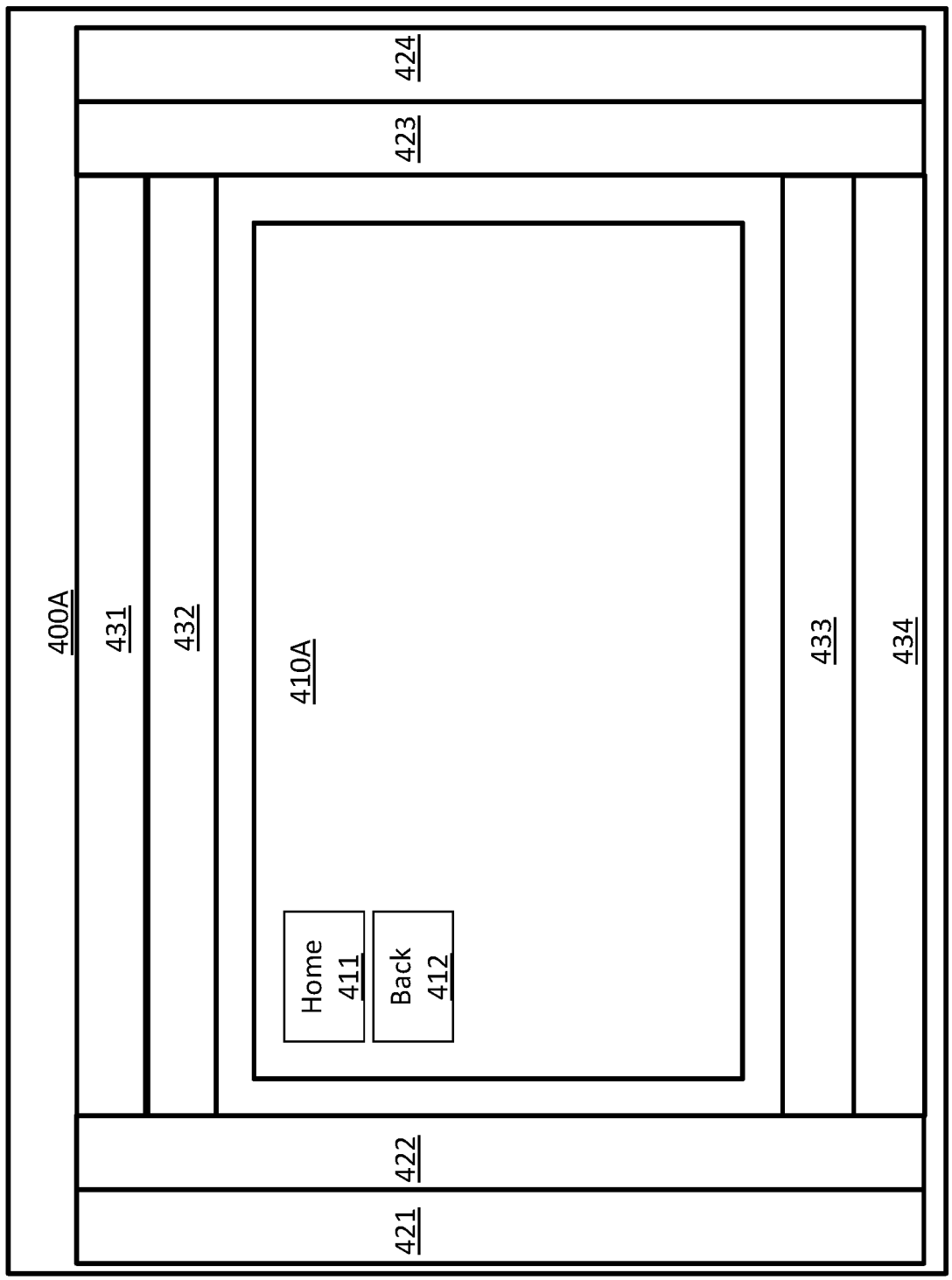

FIG. 4A through 4F illustrate examples of such a third user interface that includes two sets of sliding bars. Referring to FIG. 4A, an example user interface 400A is illustrated. The user interface 400A includes not only multiple vertical sliding bars 421 through 424, but also include multiple horizontal sliding bars 431-434. Each of the vertical sliding bars 421 through 424 may still correspond to a respective visualization 210 through 240 of FIG. 2. Each of the horizontal sliding bars 431-434 may correspond to a respective sub-visualization 312A-314A of FIG. 3A (and a respective sub-visualization 221, 222, 224 of FIG. 2).

For example, a user may select the sub-visualization 312A of FIG. 3A. After the sub-visualization 312A is selected, the user interface 400A may be displayed. The user interface 400A also includes a center visualization 410A. The center visualization 410A may display content related to the selected sub-visualization 312A. The center visualization 410A may also include a home button (or link) 411 and/or a back button (or link) 412 that allows a user to quickly navigate back to the home interface 200 or the previous user interface 300A.

The horizontal sliding bar 432 may correspond to selected sub-visualization 312A, and be deemed as a selected sliding bar. Since the sub-visualization 312A is part of the sliding bar 322 (which corresponds to the sliding bar 422), the vertical sliding bar 422 is also deemed as a selected sliding bar. Similarly, different embodiments may be implemented to indicate which sliding bar is selected. For example, the selected sliding bars may be highlighted or presented in a different color than the not-selected sliding bars.

Figure 4B:
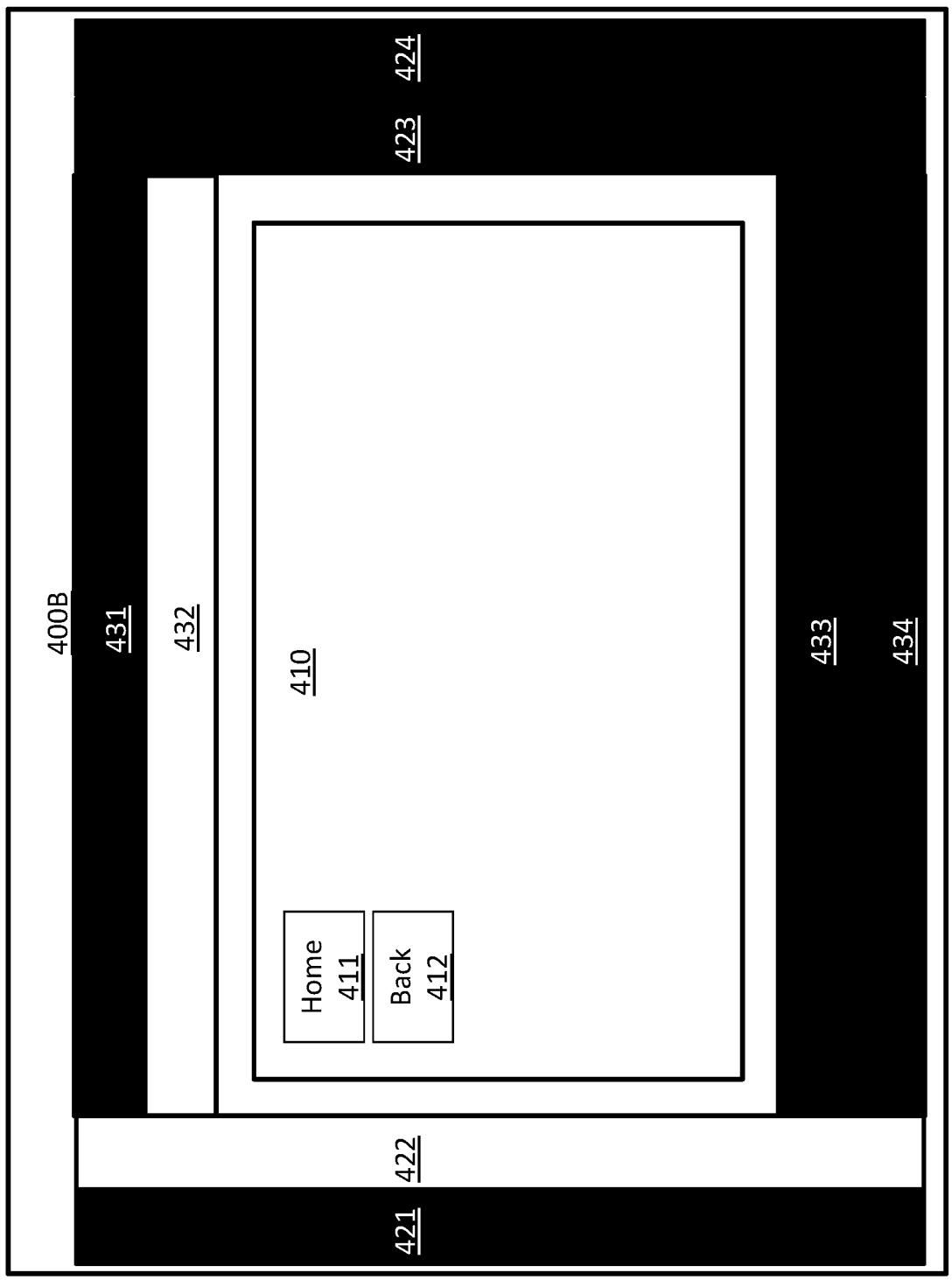

FIG. 4B illustrates an example embodiment of using different coloring scheme to indicate user which sliding bar(s) are selected. As illustrated in FIG. 4B, the sliding bars 432 and 422 are selected. Each of the selected sliding bars 432 and 422 is displayed next to the enter visualization 410, and also colored in white (or in a lighter color). The not-selected sliding bars 421, 423, 424, 431, 433, and 434 are colored in black (on in a darker color). As illustrated, the user interface 400B displays to the user two levels of functions. The first level functions are displayed via the vertical sliding bars 421-424, and the second level functions are displayed via the horizontal sliding bars 431-434. Users can select or execute a first level function by selecting or clicking the vertical sliding bars 421-424. At the same time, users can also select or execute a second level function by selecting or clicking the horizontal sliding bars 431-432.

Figure 4C:
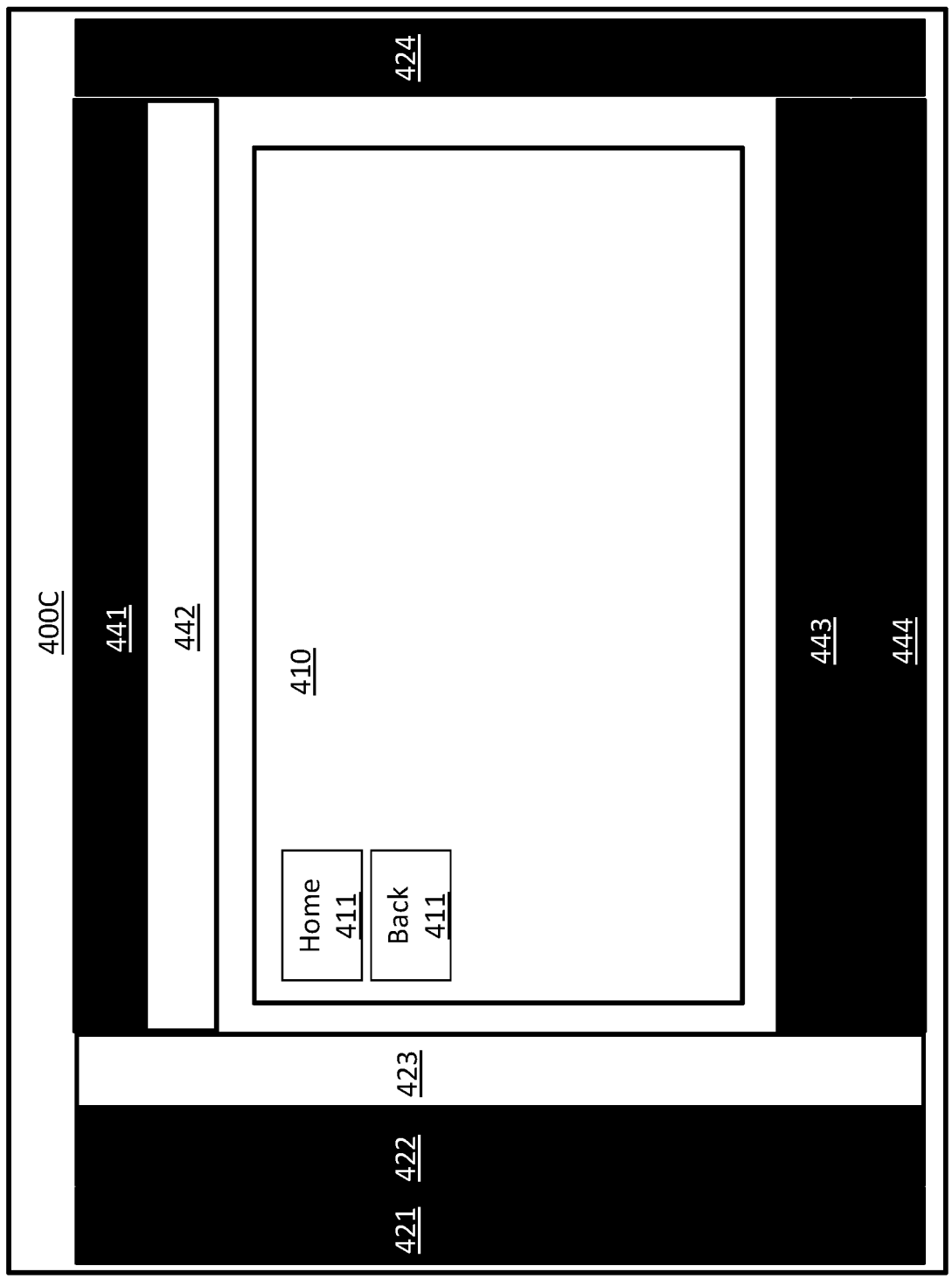

FIG. 4C illustrates an example in which a user selects a different first-level function by clicking the sliding bar 423. After the sliding bar 423 is clicked, the selected sliding bar 423 may move from the right side to the left side and changes its color from black (or a dark color) to white (a light color). In some embodiments, if the sliding bar 423 corresponds to a first level function that also includes multiple subfunctions, each of the multiple subfunctions may be displayed as sub-visualizations in the center visualization 310 of FIG. 3A, and the horizontal sliding bars may be removed, until the user clicks one of the sub-visualizations. In some other embodiments, a default subfunction may be selected, and each of the subfunctions is displayed as a horizontal sliding bar 441-444 automatically. Thereafter, the user can then select a different subfunction by clicking a different horizontal bar.

Figure 4D:
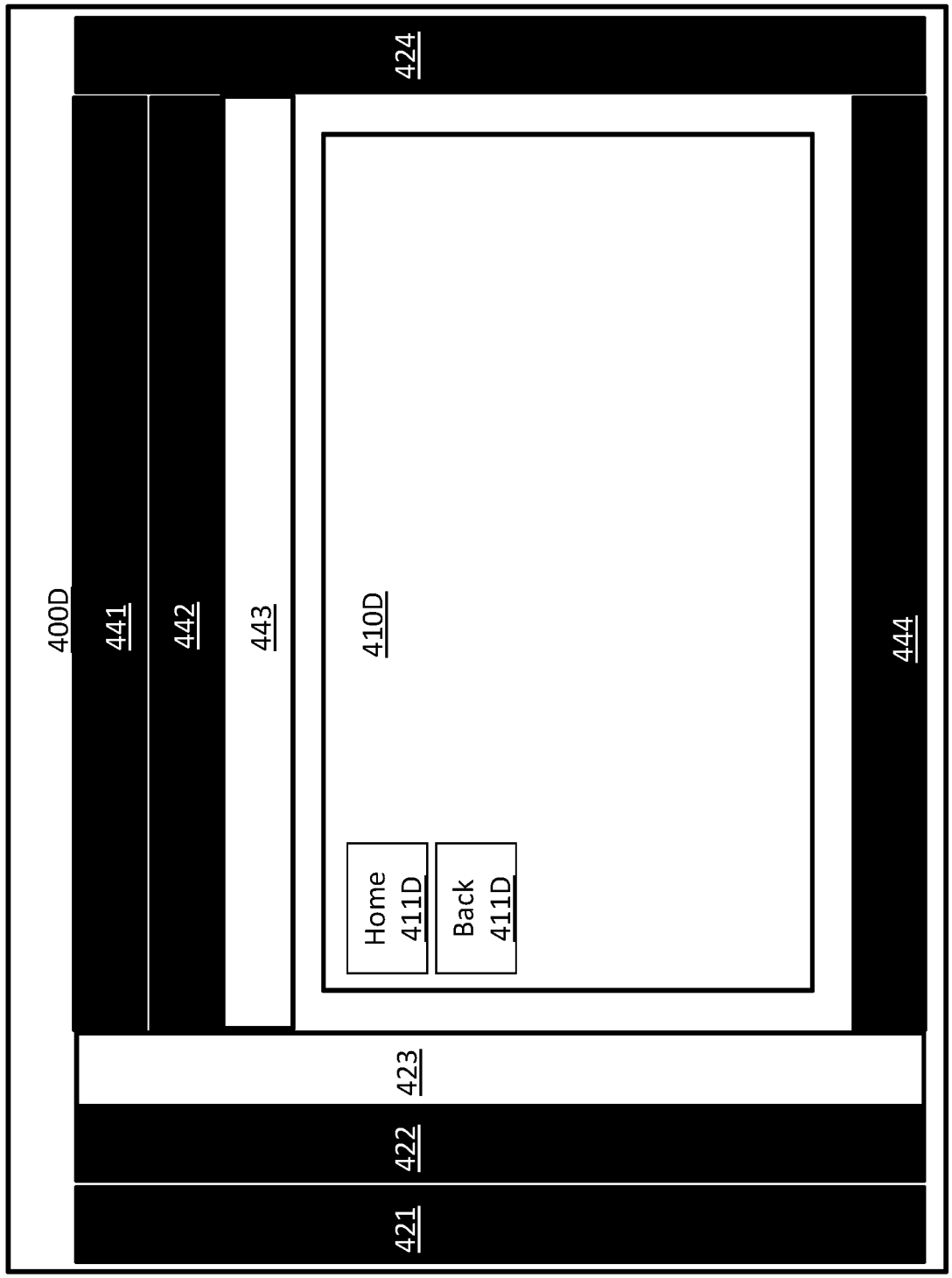

FIG. 4D illustrates an example, in which a user selected a different horizontal sliding bar 443. As illustrated in FIG. 4D, after the user selects the sliding bar 443, the sliding bar 443 may move from the bottom edge to the top edge and change its color from black (or a darker color) to white (or a lighter color). At the same time, the previously selected sliding bar 442 is no longer selected, thus, changes its color from white (or a lighter color) to black (or a darker color).

Figure 4E:
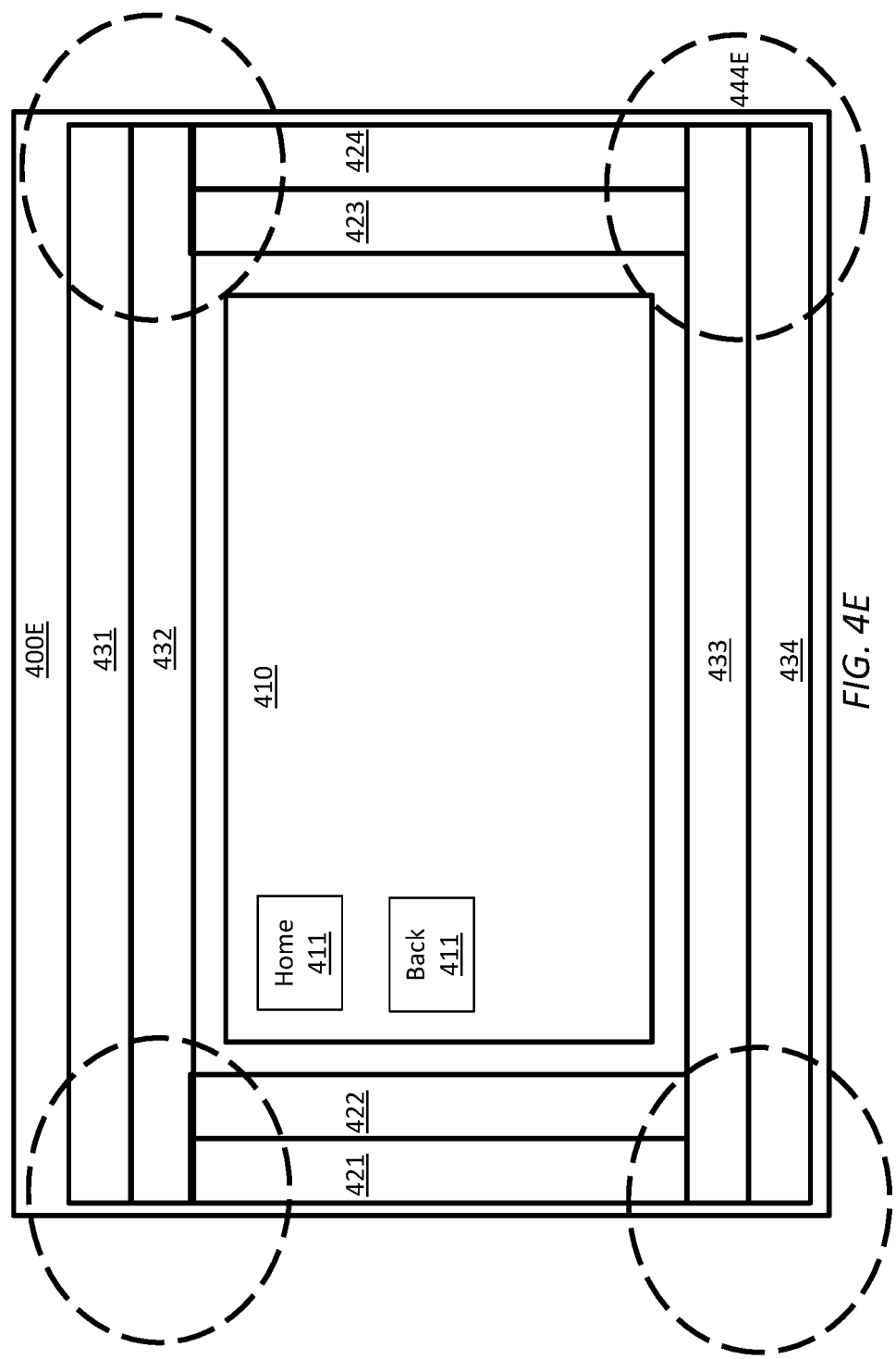

Furthermore, different layouts may be implemented to integrate the two sets of sliding bars. As illustrated in FIGS. 4A through 4D, the vertical sliding bars 421 through 424 extend over the horizontal sliding bars 431 through 434 (and/or 441 through 444). Such embodiments are not necessary. For example, FIGS. 4E and 4F further illustrate different integrations of the vertical bars and the horizontal bars. FIG. 4E illustrates an embodiment in which the horizontal bars extend over the vertical bars, and FIG. 4F illustrates an embodiment in which each horizontal bar extends over one side of vertical bar, and each vertical bar also extends over one side of horizontal bar.

The different layouts may be implemented depending on the shape of the display. For example, if the display is a phone that has a narrow width, the horizontal bars may extend over the vertical bars, such that the horizontal bars may be longer to display more text or icons on it. A user may also be allowed to setup different layout or color of the sliding bars.

Furthermore, an animation may be displayed when a sliding bar moves from one place to another. A user may also be allowed to select different animations of the sliding bars moving from one place to the other.

The sliding bars may also be transparent or semi-transparent, such that a portion of the horizontal bars may overlap a portion of the vertical bars. Alternatively, or in addition, the sliding bars may also overlap a portion of the center display 310 and/or 410. In some embodiments, the sliding bars may only show up when the user's mouse hovers to the edge of the display. To prevent the edge of the interface to become over crowded, a total number of the bars on each side may be pre-set, e.g., 3 or 4.

Additionally, it is not necessary that the two sets of sliding bars are horizontal and vertical. Any number sets of sliding bars may be implemented at any angle. The embodiments illustrated in FIGS. 3A through 4F are merely examples that shows an embodiment that displays two-levels hierarchical functions. More level hierarchical functions may be displayed by having more sets of bars displayed on the edges of a center visualization. For example, a hexagon shaped center visualization may be generated for a 3-level hierarchical functions.

Furthermore, in some embodiments, the application may omit the home interface 200 entirely and show users the second user interface 300A directly. For example, one of the functions corresponding to visualizations 210-240 may be set as the default function. Accordingly, when the application is initiated, the second user interface 300A may be directly presented to the user with the default function selected, i.e., the sliding bar corresponding to the default function is selected, and the center visualization 310 displays the content related to the default function.

Similarly, in some embodiments, the application may omit both the home interface 200 and the second user interface 300A, and show users the third user interface 400A directly. For example, one of the subfunctions may be set as the default function. Accordingly, when the application is initiated, the third user interface 400A may be directly presented to the user with the default function selected, i.e., the sliding bars corresponding to the default subfunction are selected, and the center visualization 410 displays the content related to the default subfunction.

The application may have a default setting related to which user interface (e.g., the home interface 200, the second user interface 300A, or the third user interface 400A) is to be displayed initially. A user may be allowed to reset the default settings based on the user's preference.

Additionally, flip boards may be implemented in any one of the user interfaces, including but are not limited to the home interface 200, the second user interface 300A, and the third user interface 400A, to further save the space on the display. A flip board is a type of visualization that flips to change the content displayed on it. For example, a visualization may display as if it is a two-sided flip board. One side displays a first set of content, and the other side displays a second set of content. A flip board may flip periodically by itself. Alternatively, or in addition, the flip board may flip based on a user indication. For example, when a user clicks the flip board, the flip board flips from one side to the other. An animation may be played when the flip board flips as if it is a physical board flipping around. Alternatively, or in addition, any other animation may be played when the flip board flips.

Furthermore, unlike a physical flip board, a software flip board is not limited to two sides. Any number of different sides may be implemented depending on the amount of related content, the size of the font that a user may desire, etc. One or more additional visual indications may be shown to a user, such that a user can tell which side of the flip board is currently displayed. For example, the flip board may have a different color on each side, the flip board may also include a numerical number at a corner to indicate which side it is currently displaying. Different user inputs may be used to flip a flip board and/or select the content displayed on the flip board. For example, a mouse right click may be used to flip a flip board, and a mouse left click may be used to select the content displayed on the flip board. Similarly, when the display is a touch screen, different user gestures may be set or defined to perform different display functions of the flip board, and any other functions related to the function or subfunction of the center visualization and/or the sliding bars.

In some embodiments, the sliding bars may be used in combination with one or more flip boards. For example, flip boards may be displayed as at least a portion of the center visualization. Thus, additional subfunctions may be displayed on different sides of the flip board(s) in the center visualization.

Alternatively, or in addition, each of the sliding bars may also be a flip board. As we briefly described, the maximum number of sliding bars on each side may be preset as 3 or 4. Additional functions corresponding to sliding bars may be displayed on different sides of each sliding bars. For example, the most frequently used functions may be displayed on the first side of the sliding bars, and the less frequently used functions may be displayed on the second side of the sliding bars. As another example, one side of the sliding bar may display a logo, icon, or a short name of the function, and the other side of the sliding bar may further explain to the user the detailed function of the corresponding sliding bar.

Figure 5:
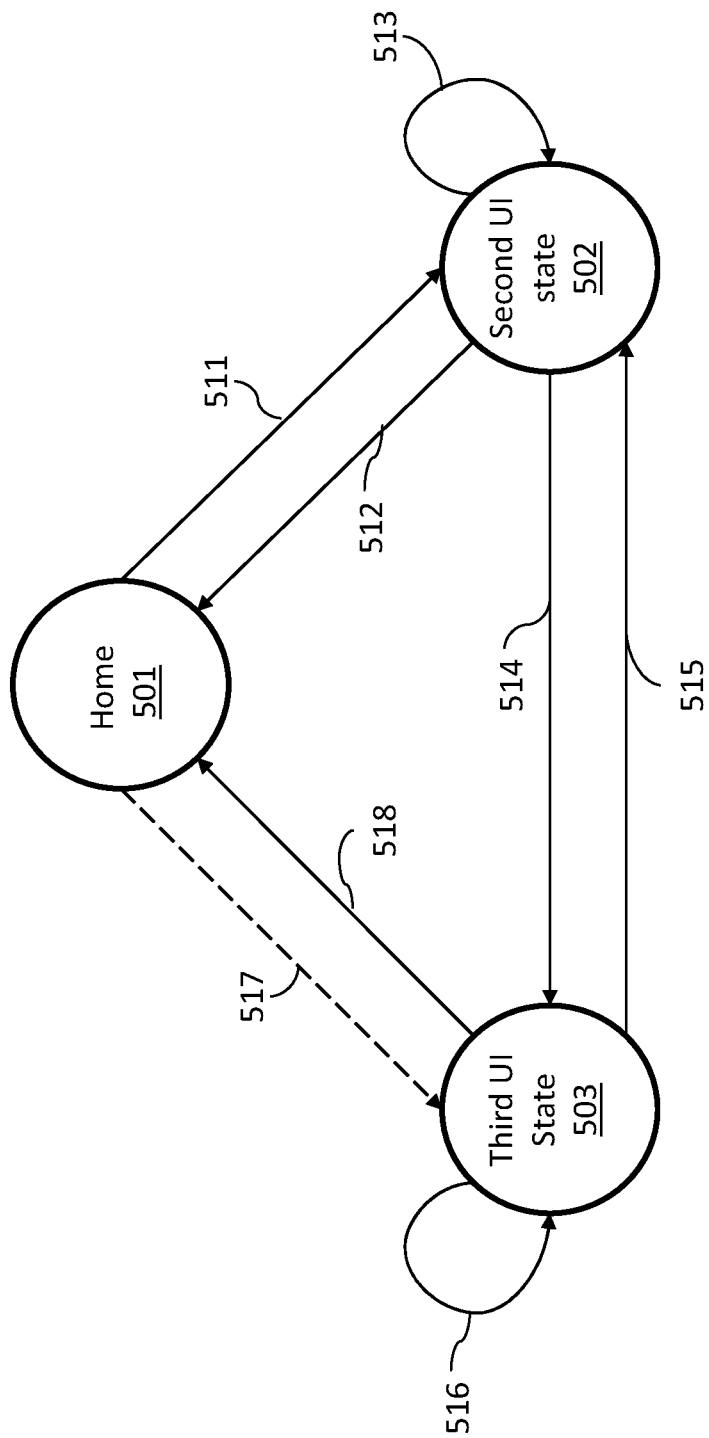
FIG. 5 illustrates a state diagram including example states that an example user interface may transit from one to another.

FIG. 5 illustrates a state diagram of example states, which an example user interface may transit from one to another. For example, the home state 501 represents that the user is at the home interface 200. From the home state 501, the user can navigate to a user interface 300A that includes sliding bars at a first and/or second edges (e.g., vertical sliding bars 321-324). The second user interface 300A having sliding bars at a first and/or second edges may be deemed as a "second UI state" 502. The one-directional arrow 511 represents a situation that the user navigates from the home state 501 to the second UI state 502. From the second UI state 502, the user can also navigate back to the home state 501, which is represented by the one-directional arrow 512.

The user can also navigate to a third UI state 503 from the first UI state 502, which is represented by the one-directional arrow 514. The third UI state 503 is the state when the third user interface 400A having sliding bars at a third and/or fourth edges. The user can also navigate from the third user interface 400A (state 503) back to the second user interface 300A (state 502), which is represented by the one-directional arrow 515. For example, when the user in the user interface 400A selects one of the vertical bars 421 through 424, the third user interface 400A may transit back to the second user interface 300A.

From the third user interface 400A, a user may also directly navigate back the home interface 200 (state 501), which is represented by the one-directional arrow 518. Further, in each of the second UI state 502 and the third UI state 503, the user can remain in the current state when navigating within the same level of the functions or sliding bars. For example, when the user is in front of the second user interface 300A, the user may select each one of the vertical sliding bars 321 through 324, and he/she would remain in the second UI state 502, which is represented by the one-directional arrow 513. Similarly, when the user is in front of the third user interface 400A, the user may select each one of the horizontal sliding bars 431 through 434, and he/she would remain in the third UI state 503, which is represented by the one-directional arrow 516.

Furthermore, in some embodiments, when the user is in front of the home interface 200 (state 501), the user may be allowed to select a sub-visualization directly. When a sub-visualization is selected, the user may be taken to the third user interface 400A directly from the home interface 200, which is represented by the one directional arrow 517. The arrow 517 is drawn in doted line, because in some embodiments, the user may not be allowed to jump level from the home interface 200 (state 501) directly to the third user interface 400A (state 503).

The following discussion now refers to a number of methods and method acts that may be performed. Although the method acts may be disused in a certain order or illustrated in a flow chart as occurring in a particular order, no particular ordering is required unless specifically stated, or required because an act is dependent on another act being completed prior to the act being performed.

Figure 6:
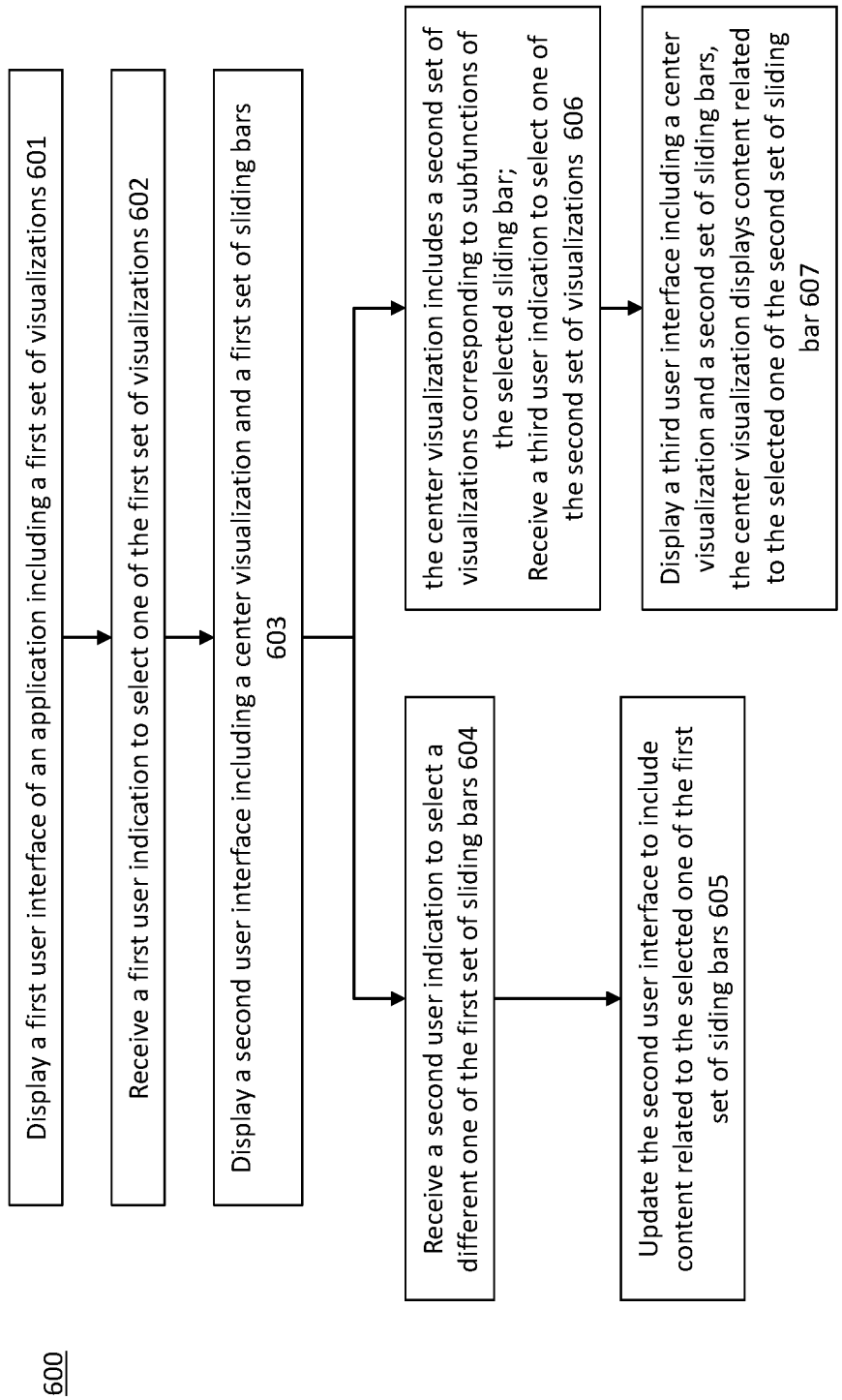
FIG. 6 illustrates a flowchart of an example method for implementing a user interface that includes sliding bars.

FIG. 6 illustrates a flowchart of example method 600 for displaying a user interface including one or more sliding bars. The method 600 includes displaying a first user interface of an application including a first set of visualization (601). The home interface 200 of FIG. 2 may be an example of first user interface. The visualizations 210-240 of FIG. 2 may be an example first set of visualization.

The method 600 also includes receiving a first user indication to select one of the first set of visualization (602). For example, a user may select visualization 220 of FIG. 2. In response to the user indication, a second user interface is displayed (603). The second user interface includes a center visualization and a first set of sliding bars. The user interface 300A of FIG. 3A may be an example second user interface.

The method 600 may also include receiving a second user indication to select a different one of the first set of sliding bars (604). For example, as illustrated in FIG. 3C, the user selected a different vertical sliding bar 323. In response to the second user indication, the second user interface will be updated (605). The updating the second user interface includes at least updating the center visualization to display content related to the selected one of the first set of sliding bars.

Further, the center visualization of the second user interface may include a second set of visualizations corresponding to subfunctions of the selected sliding bar. As illustrated in FIG. 3A, the center visualization includes a set of sub-visualizations 312A through 314A, which may be an example second set of visualizations. Each of the sub-visualizations 312A through 314A corresponds to a subfunction of the function related to sliding bar 322.

The method 600 may also include receiving a third user indication to select one of the second set of visualizations (606). In response to the third user indication, a third user interface may be displayed (607). The third user interface includes a center visualization and a second set of sliding bars. The center visualization corresponds to functions of the selected one of the second set of sliding bars. The user interface 400A of FIG. 4A may be an example third user interface, and the sliding bars 431 through 434 may be an example second set of sliding bars.

For example, as illustrated in FIGS. 3A and 4A, the user may decide to select a sub-visualization 312A. After the sub-visualization 312A is selected, a third visualization 400A may be displayed. The third visualization 400A includes a second set of sliding bars 431 through 434 and a center visualization 410. The center visualization corresponds to the content related to the selected sub-visualization 312A and the sliding bar 432.

For the processes and methods disclosed herein, the operations performed in the processes and methods may be implemented in differing order. Furthermore, the outlined operations are only provided as examples, an some of the operations may be optional, combined into fewer steps and operations, supplemented with further operations, or expanded into additional operations without detracting from the essence of the disclosed embodiments.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system comprising:
one or more processors; and
one or more computer-readable media having thereon computer-executable instructions that are structured such that, when executed by the one or more processors, cause the computing system to:
display a user interface of an application including (1) one or more first sliding bars, each of which extends in a first direction and each of which is configured to slide in a second direction that intersects the first direction, and (2) one or more second sliding bars, each of which extends in the second direction and each of which is configured to slide in the first direction;

wherein:

each of the one or more first sliding bars or the one or more second sliding bars is configured to be selectable by a user, each of the one or more first sliding bars corresponds to one of one or more functions of the application, each of the one or more second sliding bars corresponds to a sub-function of a function that corresponds to a selected first sliding bar, at least one of the one or more first sliding bars is displayed near a first edge of the user interface, in response to selecting the at least one first sliding bar, at least another one of the one or more first sliding bars slides from the first edge to a second edge that is on an opposite side of the user interface from the first edge, at least one of the one or more second sliding bars is displayed near a third edge of the user interface that intersects the first edge or the second edge, and in response to selecting the at least one second sliding bar, at least another one of the one or more second sliding bars slides from the third edge to a fourth edge that is on an opposite side of the user interface from the third edge.

2. The computing system of claim 1, wherein the user interface also includes a center visualization, the center visualization corresponding to a sub-function of a selected second sliding bar.

3. The computing system of claim 2, wherein at least one of one or more flip boards is included in the center visualization of the second user interface.

4. The computing system of claim 2, wherein:

a second sliding bar corresponding to the center visualization is selected;

the computing system is further caused to:

receive a second user indication to select a different second sliding bar;

in response to the second user indication, the center visualization is updated to display content corresponding to the selected second sliding bar.

5. The computing system of claim 4, wherein in response to the second user indication, the second user interface is further updated to move at least one of a previously selected sliding bar and a currently selected sliding bar between the first edge and a second edge of the second user interface.

6. The computing system of claim 5, wherein the second edge of the second user interface is on an opposite side of the first edge of the second user interface.

7. The computing system of claim 2, wherein the center visualization includes a second set of visualizations, each of which corresponds to a sub-function of a sub-function that corresponds to a selected second sliding bar.

8. The computing system of claim 1, wherein the one or more second sliding bars includes a predetermined number of sliding bars.

9. The computing system of claim 1, wherein the one or more second sliding bars are displayed horizontally on a bottom edge or a top edge of the third user interface.

10. The computing system of claim 1, wherein the one or more first sliding bars are displayed vertically on a left edge or a right edge of the second user interface.

11. The computing system of claim 1, wherein the one or more first sliding bars includes a predetermined number of sliding bars.

12. A computer implemented method for presenting a user interface, comprising:

displaying a first user interface of an application including (1) one or more first sliding bars, each of which extends in a first direction and each of which is configured to slide in a second direction that intersects the first direction, and (2) one or more second sliding bars, each of which extends in the second direction and each of which is configured to slide in the first direction;

wherein:

each of the one or more first sliding bars or the one or more second sliding bars is configured to be selectable by a user, each of the one or more first sliding bars corresponds to one of one or more functions of the application, each of the one or more second sliding bars corresponds to a sub-function of a function that corresponds to a selected first sliding bar, at least one of the one or more first sliding bars is displayed at a first edge of the first user interface or the second user interface, in response to selecting the at least one first sliding bar, at least another one of the one or more first sliding bars slides from the first edge to a second edge that is on an opposite side of the user interface from the first edge, at least one of the one or more second sliding bars is displayed near a third edge of the user interface that intersects the first edge or the second edge, and in response to selecting the at least one second sliding bar, at least another one of the one or more second sliding bars slides from the third edge to a fourth edge that is on an opposite side of the user interface from the third edge.

13. The computer implemented method of claim 12, wherein the user interface also includes a center visualization, the center visualization corresponds to a sub-function of a selected second sliding bar.

14. The computer implemented method of claim 13, wherein at least one of one or more flip boards is included in the center visualization of the second user interface.

15. The computer implemented method of claim 13, further comprising:

receiving a second user indication to select a different second sliding bar;

in response to the second user indication, updating the center visualization to display content corresponding to the selected second sliding bar.

16. The computer implemented method of claim 15, wherein in response to the second user indication, the second user interface is further updated to move at least one of a previously selected sliding bar and a currently selected sliding bar between the first edge and a second edge of the second user interface.

17. The computer implemented method of claim 16, wherein the second edge of the second user interface is on an opposite side of the first edge of the second user interface.

18. The computer implemented method of claim 13, wherein the center visualization includes a second set of visualizations, each of which corresponds to a sub-function of a sub-function that corresponds to a selected second sliding bar.

19. The computer implemented method of claim 12, wherein the one or more first sliding bars includes a predetermined number of sliding bars.

20. A computing program product comprising one or more hardware storage devices having stored thereon computer-executable instructions, when the computer-executable instructions are executed by one or more processors of a computing system, cause the computing system to:
- display a first user interface of an application including (1) one or more first sliding bars, each of which extends in a first direction and each of which is configured to slide in a second direction that intersects the first direction, and (2) one or more second sliding bars, each of which extends in the second direction and each of which is configured to slide in the first direction;
- wherein:
  - each of the one or more first sliding bars or the one or more second sliding bars is configured to be selectable by a user,
  - each of the one or more first sliding bars corresponds to one of one or more functions of the application,
  - each of the one or more second sliding bars corresponds to a sub-function of a function that corresponds to a selected first sliding bar,
  - at least one of the one or more first sliding bars is displayed at a first edge of the first user interface or the second user interface,
  - in response to selecting the at least one first sliding bar, at least another one of the one or more first sliding bars slides from the first edge to a second edge that is on an opposite side of the user interface from the first edge,
  - at least one of the one or more second sliding bars is displayed near a third edge of the user interface that intersects the first edge or the second edge, and
  - in response to selecting the at least one second sliding bar, at least another one of the one or more second sliding bars slides from the third edge to a fourth edge that is on an opposite side of the user interface from the third edge.

* * * * *